2,743,395

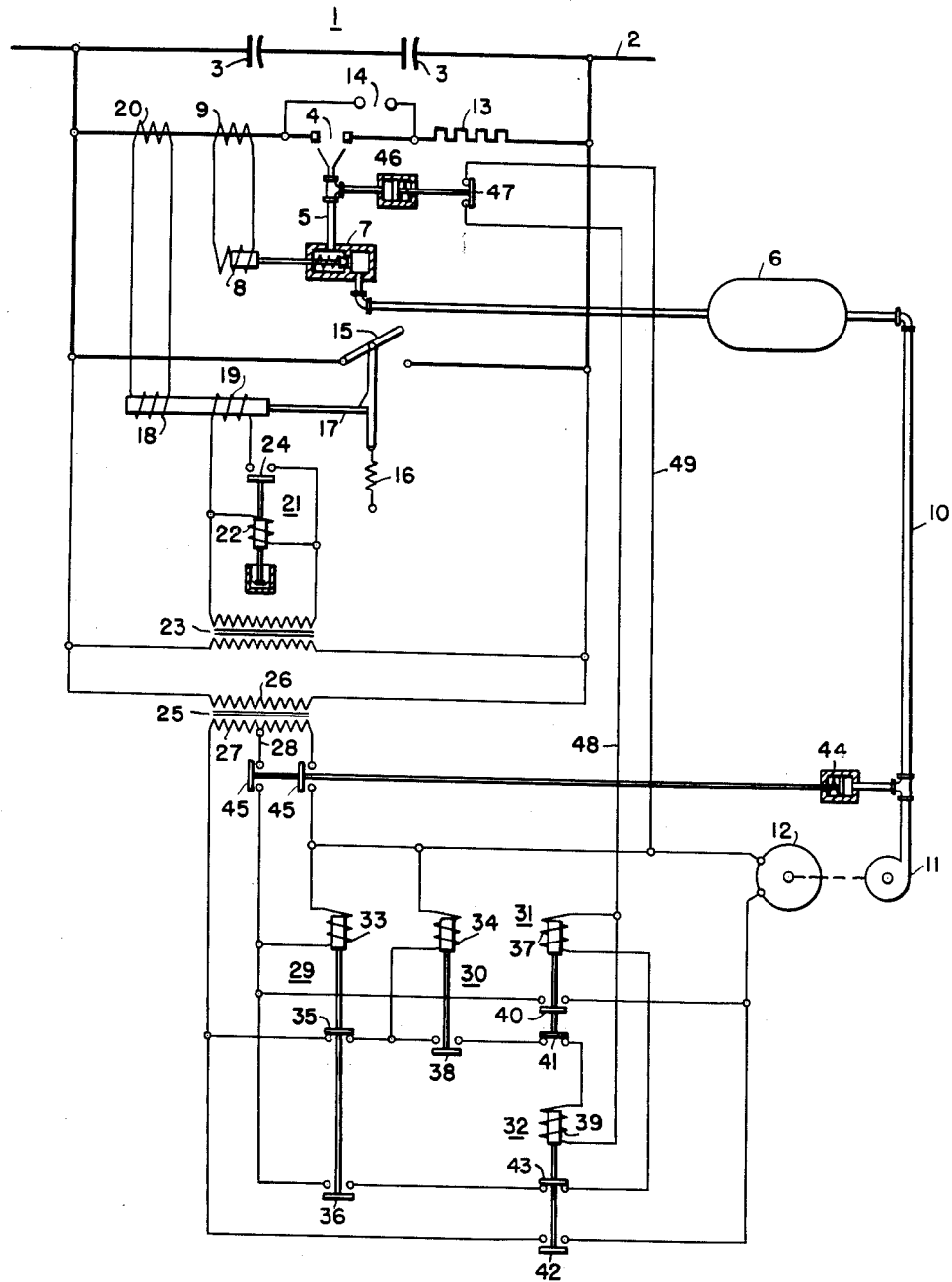
April 24, 1956 — R. E. MARBURY ET AL — 2,743,395
PROTECTIVE SYSTEM FOR SERIES CAPACITORS
Filed Feb. 28, 1952
WITNESSES:
INVENTORS
Ralph E. Marbury
and Zeno Neri.
ATTORNEY United States Patent Office 2,743,395
Patented Apr. 24, 1956

PROTECTIVE SYSTEM FOR SERIES CAPACITORS

Ralph E. Marbury, Pittsburgh, and Zeno Neri, Wilkinsburg, Pa., assignors to Westinghouse Electric Corporation, East Pittsburgh, Pa., a corporation of Pennsylvania Application February 28, 1952, Serial No. 274,016

12 Claims. (Cl. 317—12)

The present invention relates to series capacitor installations in alternating-current lines, and more particularly to a protective system for series capacitors in high-voltage, synchronous, alternating-current transmission lines where system stability is a primary consideration in the operation of the line.

Capacitors are connected in series in alternating-current transmission or distribution lines to neutralize part, or all, of the inductive reactance of the line, in order to raise the stability limit, or the power limit, of a transmission line, or to improve the voltage regulation of a distribution line. Since such capacitors are connected directly in series in the line and carry the line current, the voltage across the capacitor is proportional to the line current, and in case of a fault on the line, the voltage across the capacitor may rise to many times its normal value. Standard capacitor units such as are used in series capacitor installations are capable of withstanding overvoltages of the order of 150% of their normal rated voltage for brief periods, or somewhat higher voltages momentarily, but they cannot safely be subjected to voltages in excess of about 250% to 300% of normal voltage, even momentarily.

It is not practical to utilize capacitors which are capable of withstanding the maximum voltage to which they may be subjected under fault conditions, because of the excessive cost, since the cost of a capacitor increases approximately as the square of the voltage for which it is designed. A series capacitor installation, therefore, usually consists of capacitor units having a voltage rating determined on the basis of the normal voltage across the capacitor, together with a protective system for by-passing the capacitor under fault conditions, or other excess-current conditions, in order to protect the capacitor against over-voltage. In order to adequately protect the capacitor, the protective system must operate to by-pass it substantially instantaneously upon the occurrence of an overvoltage of predetermined magnitude, that is, the capacitor must be effectively by-passed within the first half-cycle of fault current. Because of this requirement of substantially instantaneous operation, spark gaps are usually used in these protective systems since no switch, or other device involving mechanical movement, could operate fast enough.

When series capacitors are installed in high-voltage transmission lines, where system stability is a limiting consideration in the operation of the line, and where the capacitor is installed for the primary purpose of raising the stability limit in order to increase the amount of power that can be transmitted over the line, the problem of protection is quite difficult. This is for the reason that the capacitor must be by-passed substantially instantaneously upon the occurrence of a predetermined overvoltage, as explained above, and is thus removed from service during fault conditions when the stability problem is most acute. The capacitor must, therefore, be restored to service, by interrupting the by-pass, immediately after the fault is cleared, so that it will be available to assist in maintaining stability during the critical transient conditions immediately following clearing of the fault, when it is most needed. A satisfactory protective system for series capacitors in high-voltage transmission lines, therefore, must operate to by-pass the capacitor instantaneously upon the occurrence of a fault and to interrupt the by-pass within the first half-cycle after the fault is cleared.

A series capacitor protective system which operates in the desired manner is disclosed and claimed in a co-pending application of R. E. Marbury, Serial No. 110,947 filed August 18, 1949, now Patent No. 2,660,693, issued November 25, 1953, and assigned to Westinghouse Electric Corporation. In this system, the capacitor is by-passed by means of a protective gap device immediately upon the occurrence of a predetermined overvoltage, and the gap is made self-clearing by means of an air blast which is directed into the gap as soon as it has started to arc. The air blast extinguishes the arc in the gap at each current zero during the fault and prevents the arc from restriking on the succeeding half-cycle unless the instantaneous voltage again rises to substantially the original breakdown voltage. Thus, when the fault is cleared, the arc is prevented from restriking, and the capacitor is restored to service within the first half-cycle after the fault has been cleared so that it is fully effective for its intended purpose at the time when it is most needed.

This system has been very successful in operation, but it requires a source of compressed air for the air blast which must be supplied from an air tank located close to the gap so that the air blast can be started as rapidly as possible after the gap has broken down. In this system disclosed in the above-mentioned application, the compressed air is supplied from a main tank in a remote compressor station at ground potential, and is transmitted through an insulating conduit to an auxiliary air tank at line potential located close to the gap. This obviously requires a relatively elaborate installation to supply the air to the three phases of a three-phase series capacitor and also requires a source of low-voltage power for the motor which drives the compressor. Series capacitors are sometimes installed; however, in relatively remote or isolated locations on a transmission line, or in other locations where no source of low-voltage power is available for the compressor motor. It is usually too expensive, or undersirable for other reasons, to build a low-voltage line from the nearest available source, or to install a high-voltage transformer for supplying the compressor motor from the transmission line itself, and in such cases it is desirable to provide a supply of compressed air without requiring an outside source of power. It is also sometimes desirable to simplify the relatively elaborate and expensive air system of the earlier application if the air is to be utilized only for the air blast and is not required for operation of other protective or control devices, so that a more limited supply of air is sufficient for the desired purpose.

The principal object of the present invention is to provide a protective system for series capacitors which utilizes a protective gap provided with an air blast and which is completely self-contained and requires no outside source of power.

Another object of the invention is to provide a protective system for series capacitors which utilizes a protective gap provided with an air blast and in which the driving motor of the compressor which supplies the air is energized by the voltage across a part or all of the series capacitor itself, so that no outside source of power is required and the complete installation is self-contained and can be insulated from ground.

Still another object of the invention is to provide a protective system for series capacitors which utilizes a protective gap provided with an air blast, the driving motor of the compressor which supplies the air being energized by the voltage across part or all of the capacitor itself, and in which automatic means are provided for energizing the motor from a voltage within a desired range and for preventing energization of the motor if the available voltage is too low for satisfactory operation.

A further object of the invention is to provide a protective system for series capacitors utilizing a protective gap which is made self-clearing by an air blast supplied from a compressor driven by a motor energized by the voltage across a part or all of the capacitor, and in which means are provided for preventing operation of the motor while the air blast is flowing.

The invention will be more fully understood from the following detailed description, taken in connection with the accompanying drawing, the single figure of which is a schematic diagram showing a series capacitor installation embodying the invention.

The drawing shows a protective system for a series capacitor 1 installed in an alternating-current line 2. The line 2 represents one phase of a high-voltage, three-phase, synchronous transmission line in which the series capacitor 1 is installed for the purpose of raising the stability limit of the system and thus increasing the amount of power that can be transmitted over the line. It will be understood that similar equipment is provided in each of the other two phases, which have not been shown in order to avoid unnecessary complication of the drawing. The series capacitor 1 consists of a suitable number of individual capacitor units 3 connected together in any suitable series or series-parallel arrangement to give the desired capacitive reactance and current capacity. The individual capacitor units 3 are thus connected in a bank which is connected in series in the line 2. The terms "series capacitor" and "capacitor," as used herein, are to be understood as including any necessary number of individual capacitor units, and the capacitor units 3 shown in the drawing are representative of any necessary number of individual capacitor units, a relatively large number of parallel-connected units normally being used.

The series capacitor 1 is protected against over-voltages resulting from faults, or other excess-current conditions, on the line 2 by means of a main spark gap device 4 connected across the capacitor 1. The spark gap device 4 preferably has massive graphite electrodes, so as to be capable of sustaining continued arcing for a reasonable time without damage, and is preferably of the type disclosed in the copending application mentioned above, although any suitable construction might be used. The gap device 4 is made self-clearing by means of an air blast directed into the gap through a conduit 5 from a compressed air tank 6. The air blast is controlled by means of a valve 7 of any suitable type which is capable of very rapid operation, and which is actuated by means of a solenoid 8. The solenoid 8 is energized from a current transformer 9 in the circuit of the gap device 4, so that the valve is opened to initiate the air blast substantially immediately after the gap 4 has broken down. Compressed air is supplied to the tank 6 through a conduit 10 from a compressor 11 driven by a motor 12.

A resistor 13 is connected in series with the gap device 4 across the capacitor 1. The resistor 13 is preferably designed to limit the voltage across the capacitor 1 during a fault when the gap 4 is arcing, so that the capacitor is protected against overvoltage but is not completely removed from service and is at least partially effective even during the existence of a fault, as more fully explained in the above-mentioned copending application. If desired, however, the resistor 13 might have a lower value and be designed primarily as a dampening resistor, to limit the capacitor discharge current, thus preventing excessive transient currents and preventing damage to the capacitor by repetitive discharges.

A back-up spark gap device 14 may be connected in parallel with the main gap device 4. The back-up gap 14 may be of any suitable type and is intended to arc over to protect the capacitor 1 if the main gap 4 fails to operate for any reason. The back-up gap 14 is therefore set to have a somewhat higher breakdown voltage than the main gap, so that it operates only if the main gap does not. Thus, the main gap 4 may be set for a breakdown voltage equal to about 250% of the normal voltage across the series capacitor 1, which is the maximum voltage that should be permitted to occur across the capacitor, while the back-up gap 14 may be set for a breakdown voltage of about 300% of the normal voltage, so that it will protect the capacitor if the main gap 4 fails to operate.

Protection against certain abnormal conditions is preferably also provided by the means disclosed and claimed in a copending application of R. E. Marbury, Serial No. 274,017, filed February 28, 1952, although other protective means might be used. As more fully described in that application, the protective system includes a by-pass switch 15 which is biased to closed position by a spring 16, but which is normally held in the open position by a latching device 17, of any suitable type. The latching device 17 is released, to allow the by-pass switch 15 to close, by energizing either one of two trip coils 18 and 19. The trip coil 18 is energized from a current transformer 20 in the circuit of the gap device 4 so that it is energized as soon as the gap starts to arc over. The tripping mechanism is designed with an inherent time delay which may, for example, be of the order of 30 cycles, so that the latch 17 is not tripped unless the gap 4 continues to arc for more the than the expected time within which a fault on the line 2 should be cleared. The trip coil 19 is controlled by a relay 21 which has a coil 22 energized from a potential transformer 23 connected across the series capacitor 1, so that the coil 22 is responsive to the voltage across the capacitor 1. The relay 21 is a time-delay relay, preferably having inverse time characteristics, and is set to operate on a predetermined overvoltage of a lower magnitude than the voltage setting of the gap 4, to provide protection against sustained overvoltages of a magnitude which can be permitted for a short period but which would be harmful if allowed to continue indefinitely. Upon the occurrence of such an overvoltage, the relay 21 closes its contact 24, if the overvoltage persists for more than the predetermined time, and thus energizes the trip coil 19 to permit the by-pass switch 15 to close.

In the operation of the system, as so far described, the capacitor 1 is protected against overvoltages due to fault currents by the gap device 4, which breaks down upon the occurrence of a predetermined overvoltage and by-passes the capacitor. Immediately upon breakdown of the gap, the valve 7 is opened by the solenoid 8 and an air blast is directed through the gap to extinguish the arc on each half-cycle, so that it will fail to restrike on the first half-cycle after the fault on the line 2 is cleared when the voltage will fail to rise to the breakdown voltage of the gap, so that the series capacitor is restored to service immediately. If the gap 4 continues to arc beyond the expected time, for any reason, the trip coil 18, which is energized immediately upon breakdown of the gap, will trip the latch 17 to permit the by-pass switch 15 to close to protect the gap 4 against damage from continued arcing. If the gap 4 should fail to break down, the back-up gap 14 will arc over to protect the capacitor, and since this gap is not provided with an air blast, it will continue to arc and the trip coil 18 will trip the latch 17 to close the by-pass switch. If a sustained overvoltage of a lower magnitude than the breakdown voltage of the gap 4 should occur, the relay 21 will energize the trip coil 19 to effect closing of the by-pass switch 15. After the switch 15 has been closed in response to any of the abnormal conditions mentioned, it can be reopened manually, or in any other desired manner, to restore the capacitor to service.

As previously explained, series capacitors are sometimes installed in locations on transmission lines where no low-voltage source of power is available for supplying the compressor motor 12. The present invention provides means for energizing the compressor motor from the voltage across the series capacitor 1 itself, so as to povide a completely self-contained installation which requires no outside source of power. For this purpose, a power transformer 25 is connected across the series capacitor 1. The primary winding 26 of the transformer 25 may be connected across the entire series capacitor 1, as shown in the drawing, or it may be connected across any desired part of the capacitor, depending upon the voltage available across the capacitor bank 1. Since the voltage across the series capacitor is dependent upon the line current and may vary over a relatively wide range, the secondary winding 27 of the transformer 25 is provided with a center tap 28, and provision is made for connecting the motor 12 either to the center tap 28 or across the entire secondary winding 27, depending on the voltage.

The motor 12 is controlled by two relays 29 and 30 which control the operation of contactors 31 and 32 respectively. The relay 29 has a coil 33 which is connected to the tap 28 of the transformer so as to be responsive to the voltage across a part of the secondary winding, and the relay 30 has a coil 34 connected across the entire secondary voltage of the transformer. The relay 29 has a normally closed contact 35 connected in series with the coil 34 of the relay 30 and has a normally open contact 36 connected in series with the operating coil 37 of the contactor 31. The relay 30 has a normally open contact 38 connected in series with the operating coil 39 of the contactor 32. The contactor 31 has a main contact 40 which connects one terminal of the motor 12 to the center tap 28 of the transformer, and has an auxiliary contact 41, which is closed when the contactor is deenergized, and which is connected in series with the coil 39 of the contactor 32. The contactor 32 has a main contact 42 which connects the same motor terminal to one end of the secondary winding 27, and has an auxiliary contact 43, which is closed when the contactor is deenergized, and which is connected in series with the coil 37 of the contactor 31. The other motor terminal is connected to the other end of the secondary winding 27.

Operation of the relays 29 and 30 is controlled by a pressure switch 44, which is connected to the conduit 10 so as to be responsive to the pressure in the air tank 6. The pressure switch 44 has contacts 45 connected in the energizing circuits of the relays 29 and 30, and is arranged to close the contacts 45 when the pressure in the tank 6 falls below the desired minimum value and to open the contacts 45 when the pressure in the tank 6 rises to the desired maximum value. A pressure switch 46 is also provided connected to the conduit 5 so as to be actuated by air pressure in the conduit when the air blast is flowing to the gap 4. The pressure switch 46 has a contact 47 which is normally closed, but which is opened in response to air pressure in the conduit 5, and which is connected in the energizing circuit of the contactor coils 37 and 39.

The compressor motor 12 is a single-phase motor of any suitable type, and is designed for satisfactory operation over a relatively wide range of applied voltage. Thus, for example, if the motor 12 is nominally rated at 115 volts, it can readily be designed to operate satisfactorily at any voltage between 70 and 140 volts. The relays 29 and 30 function to connect the motor across either the full secondary voltage of the transformer 25 or across half of the secondary voltage, so that the motor is always connected to a voltage within the range which will provide satisfactory operation, even though the voltage across the capacitor 1 may vary over a much wider range.

The operation of the motor control system is as follows. When the pressure in the air tank 6 falls below the predetermined minimum value, the pressure switch 44 will close its contacts 45 to connect the relay coils 33 and 34 to the transformer 25. If the voltage across the series capacitor 1 at this time is such that the voltage across the secondary winding 27 of the transformer exceeds the minimum voltage required for satisfactory operation of the motor 12, such as 70 volts in the example mentioned, but is below the maximum voltage for operation of the motor, or 140 volts in the example given, the relay 30 is actuated and closes its contacts 38, but the voltage at the center tap 28 will be too low to operate the relay 29 so that its contact 35 remains closed. When the contact 38 of the relay 30 closes, the coil 39 of the contactor 32 is energized from the transformer 25 by a circuit extending from the secondary winding 27 through the relay contacts 35 and 38, the closed interlock contact 41 of the contactor 31, coil 39, conductor 48, contact 47, conductor 49 and contact 45 back to the secondary winding 27. Thus, the contactor 32 is energized to close its contact 42 which connects the compressor motor 12 across the secondary winding of the transformer 25. The motor therefore starts and drives the compressor to restore the air pressure in the tank 6. When the pressure reaches the desired maximum, the pressure switch opens the contacts 45, deenergizing the relays and contactors and stopping the motor.

If the voltage across the capacitor 1 increases while the motor is running so that the voltage at the center tap 28 becomes high enough for satisfactory operation of the motor, such as 70 volts in the example mentioned, or if the voltage at the center tap is of this magnitude when the pressure switch contacts 45 close, the coil 33 of the relay 29 will be sufficiently energized to actuate this relay to close its contact 36 and open its contact 35. The contact 35 is in the energizing circuit of the coil 34 so that opening of this contact deenergizes the relay 30, or prevents its energization, and the contact 38 therefore opens or remains open. If the motor is running, with the contactor 32 closed, the opening of the contact 38 deenergizes the contactor coil 39, so that the contactor opens its main contact 42 and closes its interlock contact 43. With the contacts 36 and 43 closed, the coil 37 of the contactor 31 is energized, the circuit extending from the center tap 28 of the transformer through the contacts 36 and 43, coil 37, conductor 48, pressure switch contact 47 and conductor 49 back to the transformer. Thus, the contactor 31 closes its main contact 40 and connects the motor 12 to the center tap of the transformer secondary.

It will be seen that the arrangement is such that the motor 12 is automatically connected either to the full transformer secondary voltage or to a part of the secondary voltage, so that it is always energized by a voltage within the range for which it is designed even though the voltage of the transformer may vary within much wider limits due to variation of the current in the line 2. It will also be seen that if the voltage of the transformer is too low when the contacts 45 of the pressure switch 44 close, the relays 29 and 30 will not be actuated and the motor cannot be connected to the transformer. This is an important feature since if the motor were connected to a voltage too low to start the motor, an excessive locked-rotor current would flow in the motor, causing dangerous overheating. In normal operation of the line 2, periods of low current, when the motor 12 cannot be started, are relatively infrequent and of short duration, so that there is no substantial danger of the air pressure in the tank 6 becoming too low before the compressor can be operated.

It is undesirable to subject the motor to the high voltage peaks which occur each half-cycle during a fault on the line, when the gap 4 is arcing, and the pressure switch 46 is provided for this reason. When the air blast is flowing through the gap, the switch 46 is actuated by the pressure in the conduit 5 and opens its contact 47. Since this contact is connected in the energizing circuits for the contactor coils 37 and 39, these coils are deenergized, or prevented from being energized, when the contact 47 is open, so that the motor 12 cannot be connected to the transformer 25 when the gap is arcing. It will be noted that the interlock contacts 41 and 43 of the contactors are connected so that it is impossible to energize both contactors simultaneously, since when either one is closed, the circuit for the coil of the other one is interrupted. A mechanical interlock between the two contactors may also be provided, if desired, to positively prevent simultaneous operation of both contactors.

It should now be apparent that a protective system for series capacitors has been provided which utilizes a protective gap device made self-clearing by an air blast and which is completely self-contained and requires no outside source of power to energize the compressor motor which supplies the compressed air for the air blast. Since the entire system is self-contained and is relatively simple, it can be housed in a cubicle adjoining the housings or racks in which the capacitor units 3 are mounted, and the entire installation can be insulated from ground so that no connections are required between equipment at line potential and equipment at ground potential. This results in a compact and relatively simple installation which can be located at any point on a transmission line without regard to the availability of low-voltage power for the protective system.

A preferred embodiment of the invention has been shown and described for the purpose of illustration, but it will be obvious that various modifications may be made within the scope of the invention, and it is to be understood that the invention is not limited to the specific arrangement shown, but in its broadest aspects it includes all equivalent embodiments and modifications which come within the scope of the invention.

We claim as our invention:

1. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, and relay means for effecting connection of said motor across the secondary winding of said transformer only when the voltage of said secondary winding is below a first predetermined value and above a lower predetermined value and for effecting connection of the motor across a part of the secondary winding of the transformer when the voltage is above said first predetermined value.

2. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, relay means for effecting connection of said motor across the secondary winding of the transformer only when said voltage of said secondary winding is below a first predetermined value and above a lower predetermined value and for effecting connection of the motor across a part of the secondary winding of the transformer when the voltage is above said first predetermined value, and means responsive to the pressure in the tank for controlling the operation of said relay means.

3. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, relay means for effecting connections of said motor across the secondary winding of said transformer only when the voltage of said secondary winding is below a first predetermined value and above a lower predetermined value and for effecting connection of the motor across a part of the secondary winding of the transformer when the voltage is above said first predetermined value, and means for preventing connection of the motor to the transformer when said air blast is flowing.

4. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being conected across at least a part of the capacitor, relay means for effecting connection of said motor across the secondary winding of said transformer only when the voltage of said secondary winding is below a first predetermined value and above a lower predetermined value and for effecting connection of the motor across a part of the secondary winding of the transformer when the voltage is above said first predetermined value, means responsive to the pressure in the tank for controlling the operation of said relay means, and means for preventing connection of the motor to the transformer when said air blast is flowing.

5. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first relay responsive to the secondary voltage of said transformer, a second relay responsive to the voltage across a part of the secondary winding of the transformer, said first relay being adapted to effect connection of said motor across the transformer secondary winding only when said secondary voltage exceeds a predetermined value, and said second relay being adapted to effect connection of the motor across said part of the transformer secondary winding and to prevent operation of the first relay when the voltage across said part of the secondary winding exceeds said predetermined value.

6. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first relay responsive to the secondary voltage of said transformer, a second relay responsive to the voltage across a part of the secondary winding of the transformer, said first relay being adapted to effect connection of said motor across the transformer secondary winding only when said secondary voltage exceeds a predetermined value, and said second relay being adapted to effect connection of the motor across said part of the transformer secondary winding and to prevent operation of the first relay when the voltage across said part of the secondary winding exceeds said predetermined value, and means responsive to the pressure in the tank for controlling the connection of the motor to the transformer.

7. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first relay responsive to the secondary voltage of said transformer, a second relay responsive to the voltage across a part of the secondary winding of the transformer, said first relay being adapted to effect connection of said motor across the transformer secondary winding only when said secondary voltage exceeds a predetermined value, and said second relay being adapted to effect connection of the motor across said part of the transformer secondary winding and to prevent operation of the first relay when the voltage across said part of the secondary winding exceeds said predetermined value, and means for preventing connection of the motor to the transformer when said air blast is flowing.

8. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first relay responsive to the secondary voltage of said transformer, a second relay responsive to the voltage across a part of the secondary winding of the transformer, said first relay being adapted to effect connection of said motor across the transformer secondary winding only when said secondary voltage exceeds a predetermined value, and said second relay being adapted to effect connection of the motor across said part of the transformer secondary winding and to prevent operation of the first relay when the voltage across said part of the secondary winding exceeds said predetermined value, means responsive to the pressure in the tank for controlling the connection of the motor to the transformer, and means for preventing connection of the motor to the transformer when said air blast is flowing.

9. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first contactor for connecting said motor across the secondary winding of the transformer, a second contactor for connecting the motor across a part of said secondary winding, a first relay responsive to the transformer secondary voltage and adapted to effect operation of the first contactor only when the secondary voltage exceeds a predetermined value, and a second relay responsive to the voltage across said part of the transformer secondary winding and adapted to effect operation of the second contactor and to prevent operation of the first relay when the voltage across said part of the secondary winding exceeds said predetermined value.

10. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first contactor for connecting said motor across the secondary winding of the transformer, a second contactor for connecting the motor across a part of said secondary winding, a first relay responsive to the transformer secondary voltage and adapted to effect operation of the first contactor only when the secondary voltage exceeds a predetermined value, a second relay responsive to the voltage across said part of the transformer secondary winding and adapted to effect operation of the second contactor and the prevent operation of the first relay when the voltage across said part of the secondary winding exceeds said predetermined value, and means responsive to the pressure in the tank for controlling the energization of said relays from the transformer.

11. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first contactor for connecting said motor across the secondary winding of the transformer, a second contactor for connecting the motor across a part of said secondary winding, a first relay responsive to the transformer secondary voltage and adapted to effect operation of the first contactor only when the secondary voltage exceeds a predetermined value, a second relay responsive to the voltage across said part of the transformer secondary winding and adapted to effect operation of the second contactor and to prevent operation of the first relay when the voltage across said part of the secondary winding exceeds said predetermined value, and means for preventing operation of said contactors when the air blast is flowing.

12. A series capacitor installation for an alternating-current line comprising a capacitor adapted to be connected in series in said line, a protective gap device connected across said capacitor, a compressed air tank, means for directing a blast of air from said tank through the gap device, a compressor for supplying air to the tank, an electric motor for driving the compressor, a transformer having primary and secondary windings, the primary winding being connected across at least a part of the capacitor, a first contactor for connecting said motor across the secondary winding of the transformer, a second contactor for connecting the motor across a part of said secondary winding, a first relay responsive to the transformer secondary voltage and adapted to effect operation of the first contactor only when the secondary voltage exceeds a predetermined value, a second relay responsive to the voltage across said part of the transformer secondary winding and adapted to effect operation of the second contactor and to prevent operation of the first relay when the voltage across said part of the secondary winding exceeds said predetermined value, means responsive to the pressure in the tank for controlling the energization of said relays from the transformer, and means for preventing operation of said contactors when the air blast is flowing.

References Cited in the file of this patent

UNITED STATES PATENTS

| Number | Name | Date |
|---|---|---|
| 1,185,944 | Schley | June 6, 1916 |
| 2,313,921 | Carlin et al. | Mar. 16, 1943 |
| 2,399,367 | Marbury | Apr. 30, 1946 |
| 2,576,132 | Marbury | Nov. 27, 1951 |
| 2,584,710 | Johnson | Feb. 5, 1952 |